(12) United States Patent
Wang et al.

(10) Patent No.: US 11,314,961 B2
(45) Date of Patent: Apr. 26, 2022

(54) TEXTURE IMAGE ACQUISITION METHOD, TEXTURE IMAGE ACQUISITION CIRCUIT AND DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventors: Jiabin Wang, Beijing (CN); Xiaoliang Ding, Beijing (CN); Xueyou Cao, Beijing (CN); Wenjuan Wang, Beijing (CN); Jing Liu, Beijing (CN); Yichi Zhang, Beijing (CN); Haisheng Wang, Beijing (CN); Lei Wang, Beijing (CN); Yingming Liu, Beijing (CN); Yingzi Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 137 days.

(21) Appl. No.: 16/767,932

(22) PCT Filed: Jun. 12, 2019

(86) PCT No.: PCT/CN2019/090957
§ 371 (c)(1),
(2) Date: May 28, 2020

(87) PCT Pub. No.: WO2020/248169
PCT Pub. Date: Dec. 17, 2020

(65) Prior Publication Data
US 2021/0406506 A1 Dec. 30, 2021

(51) Int. Cl.
*G06K 9/28* (2006.01)
*G06K 9/00* (2022.01)
(Continued)

(52) U.S. Cl.
CPC ....... *G06K 9/0004* (2013.01); *G06K 9/00087* (2013.01); *H04N 5/353* (2013.01); *H04N 5/369* (2013.01)

(58) Field of Classification Search
CPC .......... G06K 9/00006–9/0012; G06K 9/0004; H04N 5/353–5/35581; H04N 5/35509–5/35518
See application file for complete search history.

(56) References Cited

U.S. PATENT DOCUMENTS

| 6,806,483 | B2 | 10/2004 | Iihama et al. |
| 10,885,296 | B2* | 1/2021 | Fu ............................ G06F 13/20 |
| 11,087,111 | B2* | 8/2021 | Wang ..................... G06F 3/0412 |

FOREIGN PATENT DOCUMENTS

| CN | 109508683 A | 3/2019 |
| CN | 109614958 A | 4/2019 |
| KR | 100495930 B1 | 2/2003 |

OTHER PUBLICATIONS

First Office Action issued by the Indian Patent Office in the corresponding Indian application 202047056030. The Office Action dated Jan. 14, 2022. 6 pages.

* cited by examiner

*Primary Examiner* — Brian Werner
(74) *Attorney, Agent, or Firm* — Leason Ellis LLP

(57) ABSTRACT

A texture image acquisition method, a texture image acquisition circuit and a display panel are provided. The texture image acquisition circuit includes a photosensitive circuit, the texture image acquisition method includes: allowing the photosensitive circuit to receive light from a texture, and obtaining a first curve based on a signal amount accumulated by the photosensitive circuit within a first integral time period, the first curve being a time-varying curve of a residual signal amount which is a signal amount remaining (Continued)

after a signal amount, left over by the photosensitive circuit before the first integral time period, is released over time; obtaining a first acquisition value based on a signal amount accumulated by the photosensitive circuit within a second integral time period which is after the first integral time period; obtaining a first photosensitive signal of an image of the texture; based on the first curve and the first acquisition value.

20 Claims, 8 Drawing Sheets

(51) Int. Cl.
*H04N 5/353* (2011.01)
*H04N 5/369* (2011.01)

TEXTURE IMAGE ACQUISITION METHOD, TEXTURE IMAGE ACQUISITION CIRCUIT AND DISPLAY PANEL

CROSS-REFERENCE TO RELATED PATENT APPLICATIONS

The present application is a U.S. National Phase Application under 35 U.S.C. § 371 of International Patent Application No. PCT/CN2019/090957, filed Jun. 12, 2019, the present disclosure of which is incorporated herein by reference in its entirety as part of the present disclosure.

TECHNICAL FIELD

Embodiments of the present disclosure relate to a texture image acquisition method, a texture image acquisition circuit and a display panel.

BACKGROUND

With the growing popularity of mobile terminals, more and more users use mobile terminals for authentication, electronic payment and other operations. Because of the uniqueness of a skin texture such as a fingerprint pattern or a palmprint pattern, fingerprint recognition technology combined with optical imaging is gradually adopted by mobile electronic devices for authentication, electronic payment, etc. How to improve the accuracy of texture recognition is a focus in the art.

SUMMARY

At least one embodiment of the present disclosure provides a texture image acquisition method for a texture image acquisition circuit, the texture image acquisition circuit comprises a photosensitive circuit, the texture image acquisition method comprises: allowing the photosensitive circuit to receive light from a texture, and obtaining a first curve based on a signal amount accumulated by the photosensitive circuit within a first integral time period, in which the first curve is a time-varying curve of a residual signal amount, and the residual signal amount is a signal amount which remains after a signal amount, left over by the photosensitive circuit before the first integral time period, is released over time; obtaining a first acquisition value based on a signal amount accumulated by the photosensitive circuit within a second integral time period, in which the second integral time period is after the first integral time period; and obtaining a first photosensitive signal of an image of the texture, based on the first curve and the first acquisition value.

For example, in the texture image acquisition method provided by at least one embodiment of the present disclosure, obtaining the first photosensitive signal based on the first curve and the first acquisition value comprises: obtaining a signal amount which is released by the residual signal amount within the second integral time period based on the first curve and is recorded as a first reference value; and subtracting the first reference value from the first acquisition value to obtain the first photosensitive signal.

For example, in the texture image acquisition method provided by at least one embodiment of the present disclosure, obtaining the first curve based on the signal amount accumulated by the photosensitive circuit within the first integral time period comprises: allowing the first integral time period to comprise N sub-integral time periods; obtaining a signal amount which is accumulated by the photosensitive circuit within an n-th sub-integral time period at an end of the n-th sub-integral time period and is recorded as an n-th sub-acquisition value; and obtaining the first curve according to N sub-acquisition values, in which N is greater than or equal to 2, and n satisfies $1 \leq n \leq N$.

For example, in the texture image acquisition method provided by at least one embodiment of the present disclosure, obtaining the first curve based on the signal amount accumulated by the photosensitive circuit within the first integral time period comprises: allowing the first integral time period to comprise a first sub-integral time period, a second sub-integral time period, and a third sub-integral time period; obtaining a signal amount which is accumulated by the photosensitive circuit within the first sub-integral time period at an end of the first sub-integral time period and is recorded as a first sub-acquisition value; obtaining a signal amount which is accumulated by the photosensitive circuit within the second sub-integral time period at an end of the second sub-integral time period and is recorded as a second sub-acquisition value; obtaining a signal amount which is accumulated by the photosensitive circuit within the third sub-integral time period at an end of the third sub-integral time period and is recorded as a third sub-acquisition value; and obtaining the first curve according to the first sub-acquisition value, the second sub-acquisition value, and the third sub-acquisition value.

For example, in the texture image acquisition method provided by at least one embodiment of the present disclosure, the first curve satisfies a first exponential function $y=ka^x$; and obtaining the first curve according to the first sub-acquisition value, the second sub-acquisition value, and the third sub-acquisition value comprises: obtaining a first equation $F1=ka^0-ka^{x1}+W1$ according to the first sub-acquisition value and the first exponential function; obtaining a second equation $F2=ka^{x1}-ka^{x2}+W2$ according to the second sub-acquisition value and the first exponential function; obtaining a third equation $F3=ka^{x2}-ka^{x3}+W3$ according to the third sub-acquisition value and the first exponential function; and obtaining the first exponential function according to the first equation, the second equation and the third equation, in which F1 represents the first sub-acquisition value, F2 represents the second sub-acquisition value, F3 represents the third sub-acquisition value, x1 represents an ending moment of the first sub-integral time period, x2 represents an ending moment of the second sub-integral time period, x3 represents an ending moment of the third sub-integral time period, W1 represents a signal amount obtained by the photosensitive circuit through converting the light from the texture within the first sub-integral time period, W2 represents a signal amount obtained by the photosensitive circuit through converting the light from the texture within the second sub-integral time period, and W3 represents a signal amount obtained by the photosensitive circuit through converting the light from the texture within the third sub-integral time period.

For example, in the texture image acquisition method provided by at least one embodiment of the present disclosure, the first sub-integral time period, the second sub-integral time period, and the third sub-integral time period are of an equal duration.

For example, in the texture image acquisition method provided by at least one embodiment of the present disclosure, the first sub-integral time period is of a duration of 10 milliseconds, and the second integral time period is of a duration of 60 milliseconds.

For example, in the texture image acquisition method provided by at least one embodiment of the present disclosure, the first sub-integral time period, the second sub-integral time period, and the third sub-integral time period are of an equal duration; the first curve satisfies a first exponential function $y=ka^x$; and obtaining the first curve according to the first sub-acquisition value, the second sub-acquisition value, and the third sub-acquisition value comprises: obtaining a fourth equation: $F2-F1=2ka^{x1}-ka^0-ka^{x2}$ according to the first sub-acquisition value, the second sub-acquisition value, and the first exponential function; obtaining a fifth equation: $F3-F2=2ka^{x2}-ka^{x1}-ka^{x3}$ according to the second sub-acquisition value, the third sub-acquisition value, and the first exponential function; and obtaining the first exponential function according to the fourth equation and the fifth equation, in which F1 represents the first sub-acquisition value, F2 represents the second sub-acquisition value, F3 represents the third sub-acquisition value, x1 represents an ending moment of the first sub-integral time period, x2 represents an ending moment of the second sub-integral time period, and x3 represents an ending moment of the third sub-integral time period.

For example, the texture image acquisition method provided by at least one embodiment of the present disclosure further comprises: resetting the photosensitive circuit in a reset time period, in which the reset time period precedes the first integral time period.

For example, in the texture image acquisition method provided by at least one embodiment of the present disclosure, the texture image acquisition circuit further comprises an integral calculation circuit, the photosensitive circuit comprises a photosensitive component and a switch circuit, and the switch circuit is electrically connected with the photosensitive component and the integral calculation circuit; and resetting the photosensitive circuit in the reset time period comprises: providing a control signal to the switch circuit in the reset time period to cause the switch circuit to be turned on, which further causes the photosensitive component to discharge charges through the switch circuit and the integral calculation circuit.

For example, in the texture image acquisition method provided by at least one embodiment of the present disclosure, obtaining the first acquisition value based on the signal amount accumulated by the photosensitive circuit within the second integral time period comprises: providing a control signal to the switch circuit at beginning of the second integral time period to cause the switch circuit to be turned off, then providing a control signal to the switch circuit at an end of the second integral time period to cause the switch circuit to be turned on, and performing an integral calculation using the integral calculation circuit so as to obtain the first acquisition value.

For example, in the texture image acquisition method provided by at least one embodiment of the present disclosure, the texture image acquisition circuit further comprises an integral calculation circuit, the photosensitive circuit comprises a photosensitive component and a switch circuit, and the switch circuit is electrically connected with the photosensitive component and the integral calculation circuit; obtaining the signal amount which is accumulated by the photosensitive circuit within an n-th sub-integral time period at an end of the n-th sub-integral time periods and is recorded as an n-th sub-acquisition value comprises: providing a control signal to the switch circuit at beginning of the n-th sub-integral time period to cause the switch circuit to be turned off, then providing a control signal to the switch circuit at an end of the n-th sub-integral time period to cause the switch circuit to be turned on, and performing an integral calculation using the integral calculation circuit so as to obtain the n-th sub-acquisition value.

At least one embodiment of the present disclosure provides a texture image acquisition circuit, the texture image acquisition circuit comprises a photosensitive circuit and a control circuit; the control circuit is electrically connected with the photosensitive circuit; and the control circuit is configured to allow the photosensitive circuit to receive light from a texture and obtain a first curve based on a signal amount accumulated by the photosensitive circuit within a first integral time period, the first curve being a time-varying curve of a residual signal amount, and the residual signal amount being a signal amount which remains after a signal amount, left over by the photosensitive circuit before the first integral time period, is released over time, obtain a first acquisition value based on a signal amount accumulated by the photosensitive circuit within a second integral time period, the second integral time period being after the first integral time period, and obtain a first photosensitive signal of an image about the texture, based on the first curve and the first acquisition value.

For example, in the texture image acquisition circuit provided by at least one embodiment of the present disclosure, the control circuit is further configured to obtain a signal amount which is released by the residual signal amount within the second integral time period based on the first curve and is recorded as a first reference value, and subtract the first reference value from the first acquisition value to obtain the first photosensitive signal.

For example, in the texture image acquisition circuit provided by at least one embodiment of the present disclosure, the control circuit is further configured to allow the first integral time period to comprise N sub-integral time periods, obtain a signal amount which is accumulated by the photosensitive circuit within an n-th sub-integral time period at an end of the n-th sub-integral time period and is recorded as an n-th sub-acquisition value, and obtain the first curve according to N sub-acquisition values; N is greater than or equal to 2, and n satisfies $1 \le n \le N$.

For example, in the texture image acquisition circuit provided by at least one embodiment of the present disclosure, the control circuit is further configured to allow the first integral time period to comprise a first sub-integral time period, a second sub-integral time period, and a third sub-integral time period, obtain a signal amount which is accumulated by the photosensitive circuit within the first sub-integral time period at an end of the first sub-integral time period and is recorded as a first sub-acquisition value, obtain a signal amount which is accumulated by the photosensitive circuit within the second sub-integral time period at an end of the second sub-integral time period and is recorded as a second sub-acquisition value, obtain a signal amount which is accumulated by the photosensitive circuit within the third sub-integral time period at an end of the third sub-integral time period and is record as a third sub-acquisition value, and obtain the first curve according to the first sub-acquisition value, the second sub-acquisition value, and the third sub-acquisition value.

For example, in the texture image acquisition circuit provided by at least one embodiment of the present disclosure, the first curve satisfies a first exponential function $y=ka^x$; and the control circuit is further configured to obtain a first equation $F1=ka^0-ka^{x1}+W1$ according to the first sub-acquisition value and the first exponential function, obtain a second equation $F2=ka^{x1}-ka^{x2}+W2$ according to the second sub-acquisition value and the first exponential function, obtain a third equation $F3=ka^{x2}-ka^{x3}+W3$ according to the third sub-acquisition value and the first exponential function, and obtain the first exponential function according to the first equation, the second equation and the third equation; F1 represents the first sub-acquisition value, F2 represents the second sub-acquisition value, F3 represents the third sub-acquisition value, x1 represents an ending moment of the first sub-integral time period, x2 represents an ending moment of the second sub-integral time period, x3 represents an ending moment of the third sub-integral time period, W1 represents a signal amount obtained by the photosensitive circuit through converting the light from the texture within the first sub-integral time period, W2 represents a signal amount obtained by the photosensitive circuit through converting the light from the texture within the second sub-integral time period, and W3 represents a signal amount obtained by the photosensitive circuit through converting the light from the texture within the third sub-integral time period.

For example, the texture image acquisition circuit provided by at least one embodiment of the present disclosure further comprises an integral calculation circuit; the photosensitive circuit comprises a photosensitive component and a switch circuit; the switch circuit is electrically connected with the photosensitive component and the integral calculation circuit, and the control circuit is electrically connected with the switch circuit; the control circuit is further configured to provide a control signal to the switch circuit at beginning of the second integral time period to cause the switch circuit to be turned off, then provide a control signal to the switch circuit at the end of the second integral time period to cause the switch circuit to be turned on, and perform an integral calculation using the integral calculation circuit so as to obtain the first acquisition value.

For example, in the texture image acquisition circuit provided by at least one embodiment of the present disclosure, the control circuit is further configured to provide a control signal to the switch circuit at beginning of the n-th sub-integral time period to cause the switch circuit to be turned off, then provide a control signal to the switch circuit at an end of the n-th sub-integral time period to cause the switch circuit to be turned on, and performing an integral calculation using the integral calculation circuit so as to obtain the n-th sub-acquisition value.

At least one embodiment of the present disclosure provides a display panel, and the display panel comprises a texture recognition region, and a plurality of pixel units in an array are arranged in the display region, and the pixel units arranged in the texture recognition region each comprise any one of the texture image acquisition circuits provided by the embodiments of the present disclosure.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can acquire other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Similarly, similar words such as "a", "an" or "the" do not denote a limitation of quantity, but rather denote the presence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On", "under", "left", "right", etc. are only used to indicate the relative positional relationship, and when the absolute position of the object to be described is changed, the relative positional relationship may also change accordingly.

At present, the narrow border is gradually becoming a mainstream for the design and manufacture of a display device, especially for a portable display device such as a mobile phone. One means to realize the narrow border is to integrate photosensitive components (photosensitive circuits) with a fingerprint recognition function into a display device, which realizes a fingerprint recognition mode under the screen and increases an area of a display region of the display device, and thus increasing the screen proportion.

For example, a point light source, a line light source or a light source with a certain pattern, etc. can be used as a photosensitive light source of an image sensor for texture image acquisition and further for fingerprint recognition.

The principle of texture image acquisition is described in the following by taking the case that a point light source is taken as the photosensitive light source of the photosensitive component, but this does not limit the embodiments of the present disclosure.

Figure 1A:
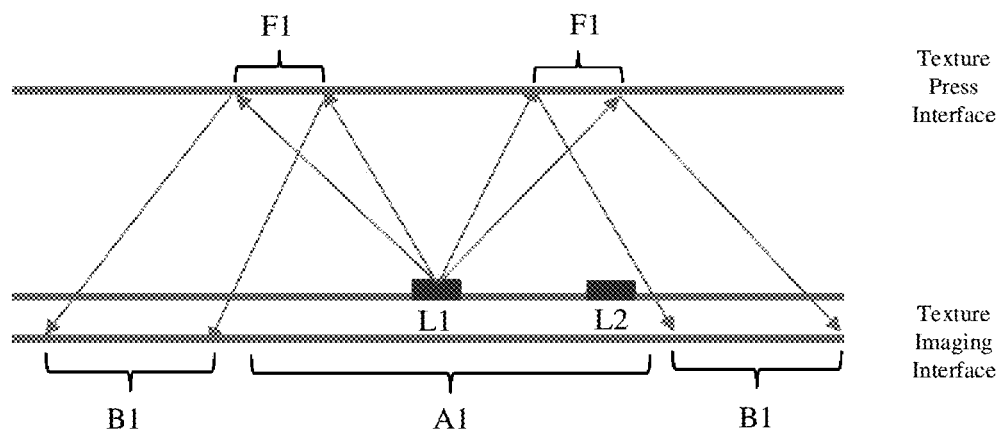
FIG. 1A is a schematic diagram of the principle of texture image acquisition.

In a reflective optical texture image acquisition device, in a texture image acquisition process, as illustrated in FIG. 1A, when a point light source L1 emits light, the light emitted by the point light source L1 irradiates a fingerprint pressing interface (e.g., an outer surface of a glass screen) at different angles, because of total reflection on the fingerprint pressing interface, a part of the light whose incident angle is larger than or equal to the critical angle θ of the total reflection undergoes total reflection, which results in that this part of the light is not able to exit from the fingerprint pressing interface, thus generating a total reflection region. Correspondingly, a part of the light whose incident angle is smaller than the critical angle θ of the total reflection exits from the fingerprint pressing interface. Therefore, a texture image can be collected by light reflected by the total reflection region, for example, a clear texture image is formed at a region B1 of the fingerprint imaging interface where the image sensor is located, the texture image corresponds to a part of the fingerprint at a region F1, the region F1 is the total reflection region, and the region B1 is an imaging region.

Specifically, for example, when a fingerprint of a user's finger presses the total reflection region F1, ridges of the fingerprint touch a surface of the total reflection region F1, so that the total reflection condition of positions corresponding to the ridges of the fingerprint is destroyed, and therefore light exits at the corresponding positions, so that an original reflection path is changed, while valleys of the fingerprint do not touch the surface of the total reflection region F1, so that the total reflection condition of positions corresponding to the valleys of the fingerprint is not destroyed, therefore light is still totally reflected at the corresponding positions, and thus the original reflection path is not changed. In this way, the light in the total reflection region causes light incident on the fingerprint imaging interface to form a texture image with alternate bright and dark at different positions because of the different influences of the valleys and the ridges of the fingerprint on the total reflection condition.

In addition, because the interference is caused by the light emitted from the fingerprint pressing interface and reflected by fingerprints or the like, or because the light emitted by the light source is reflected to the fingerprint imaging interface by other functional layers before reaching the fingerprint pressing interface, a region A1 of the fingerprint imaging interface becomes an invalid detection region, and this region cannot form an effective texture image. In the invalid region A1, a part of the light emitted by the light source L1 that is reflected to the fingerprint imaging interface by other functional layers before reaching the fingerprint pressing interface and a part of the light emitted by the light source L1 that is almost vertically reflected by the fingerprint pressing interface have higher brightness and are basically in a center of the invalid region A1, thus forming a highlight region. Because the highlight region has a higher brightness, a larger photoelectric signal is generated in a part of the image sensor array corresponding to the highlight region, which is easy to form a afterimage, thus the invalid region A1 is also known as a afterimage region.

Figure 1B:
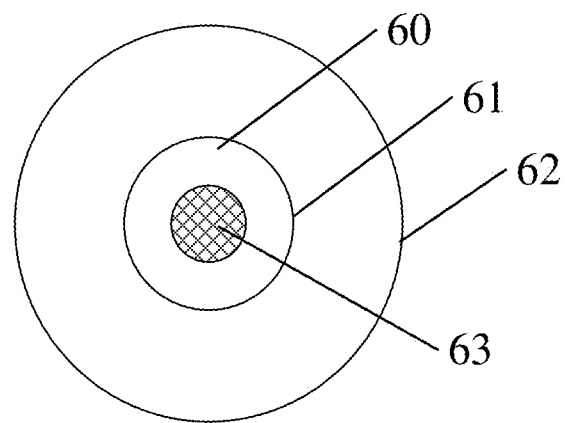
FIG. 1B is a schematic diagram of an imaging range of a point light source.

For example, FIG. 1B illustrates a schematic diagram of an imaging range of a point light source. As illustrated in FIG. 1B, in a photosensitive range of the point light source, an effective imaging range is in an annular shape, that is, in FIG. 1B, an annular region between an inner circle 61 and an outer circle 62 is the effective imaging range which corresponds to the imaging region B1 corresponding to the total reflection region F1 in FIG. 1A; a region within the inner circle 61 of the annular shape (hereinafter referred to as a ring center 60) is the invalid imaging region, corresponding to the invalid region A1 in FIG. 1A; a part of a region (the shaded region) 13 inside the ring center 60 is the highlight region (afterimage region), and it is easy to cause a afterimage by the highlight region in the image sensor array during imaging.

In the process of texture recognition, the effective imaging range formed by one light source is limited, so a plurality of side by side light sources (e.g., a plurality of light sources arranged in an array) can be simultaneously provided, and the effective imaging ranges of the light sources are combined to form a larger effective imaging range. However, as mentioned above, there is still an ineffective region for each light source, therefore in some cases, only one light source array may still fail to satisfy the requirements of texture recognition. As for this, for example, a method of lighting a plurality of light sources or a plurality of light source arrays in a time-sharing manner can be adopted to form a plurality of effective imaging ranges, and the effective imaging ranges of one light source array cover the ineffective regions of another light source array, so that the effective imaging ranges of the different light source arrays are superposed and spliced, and a larger texture image can be acquired. However, when the plurality of light sources (or light source arrays) are lit in the time-sharing manner to form a larger range of texture image, because the lighting interval time between two adjacent light sources is short, the influence of a highlight region formed by one light source on the corresponding part of the photosensitive component array does not disappear quickly, but partially remains in the corresponding part of the photosensitive component array. When the corresponding part of the photosensitive component array is located in the effective imaging region of other light sources lit later, the above-mentioned remained influence causes afterimages in the spliced texture images, thus causing an incomplete texture image formed by splicing the effective imaging ranges of the different light sources and further causing an unrecognizable texture image or inaccurate texture image recognition. On the other hand, if the lighting interval time of two adjacent light sources is prolonged, the time of texture image acquisition is prolonged and the user experience is affected.

It should be noted that, in the embodiments of the present disclosure, the interval time between two adjacent lighting of the light source array is referred to as one frame, and a texture image acquired by lighting the light source array once is referred to as one image frame. For example, in the above-mentioned texture image splicing method, the light source arrays corresponding to two adjacent frames are two different light source arrays adjacent to each other (e.g., the light sources respectively constituting the two arrays are offset from each other by a predetermined interval along a predetermined direction (e.g., transverse direction or longitudinal direction). Of course, in the process of acquiring the texture image, all light source arrays may be lit at the same time in each frame, and then the plurality of image frames acquired are processed to acquire the final texture image.

The above afterimage phenomenon is explained from another perspective below. For example, photosensitive components usually adopt photosensitive materials to perform photoelectric conversion on the light received by the photosensitive components, so as to generate carrier charges, and then perform an analog-to-digital conversion on the charges, so as to acquire a signal amount corresponding to the texture. However, the inventor discovered through research that because of the material characteristics of photosensitive materials (such as amorphous silicon, gallium arsenide and other semiconductor materials), the charges generated after a photoelectric conversion may not be completely derived from the photosensitive component in a short time, which causes that, in the process of acquiring the texture image, the residual charges of the previous frame in the photosensitive component superpose with the charges of the current frame, thus causing the afterimage phenomenon, further causing the acquired texture image to be unclear, and finally affecting the effectiveness and accuracy of texture recognition.

Figure 2A:
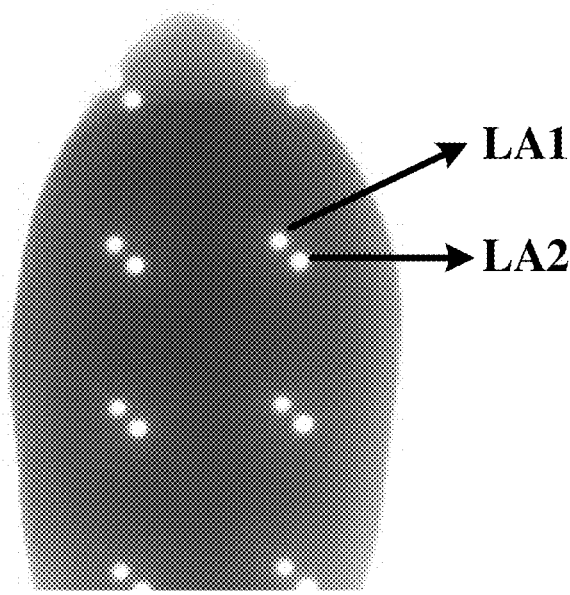
FIG. 2A is a schematic diagram of an afterimage in a texture image.
Figure 2B:
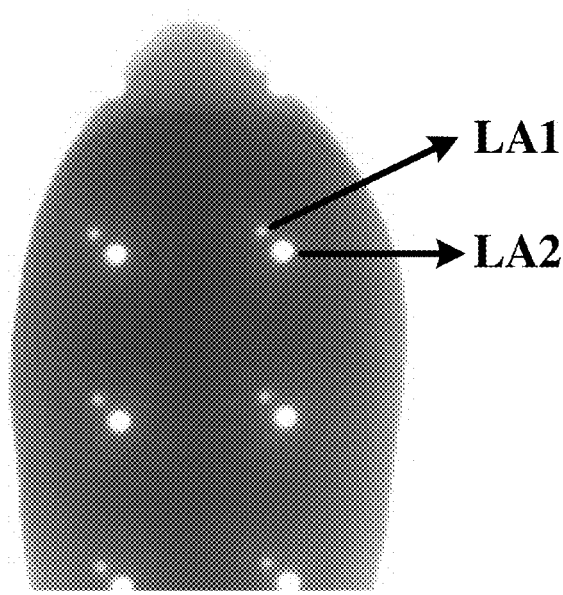
FIG. 2B is a schematic diagram of another afterimage in a texture image.

In addition, the inventor further found through research that the above-described afterimage phenomenon gradually fades or even disappear over time. For example, FIG. 2A and FIG. 2B show schematic diagrams of an afterimage phenomenon that occurs when adopting a method of image splicing. FIG. 2A shows a texture image obtained at a first moment, for example, a light source array with a relative position at the lower right corner starts to be lit at the first moment; FIG. 2B shows a texture image obtained at a second moment; and the second moment is later than the first moment. In FIG. 2A and FIG. 2B, LA1 represents an afterimage generated by residual charges in a previous frame because a light source array with a relative position at the upper left corner is lit; and LA2 represents a bright spot generated when the light source array in a current frame is normally lit. The afterimage LA1 in FIG. 2B fades relative to the afterimage LA1 in FIG. 2A. As illustrated in FIG. 2A and FIG. 2B, the afterimage phenomenon gradually fades over time.

Figure 3:
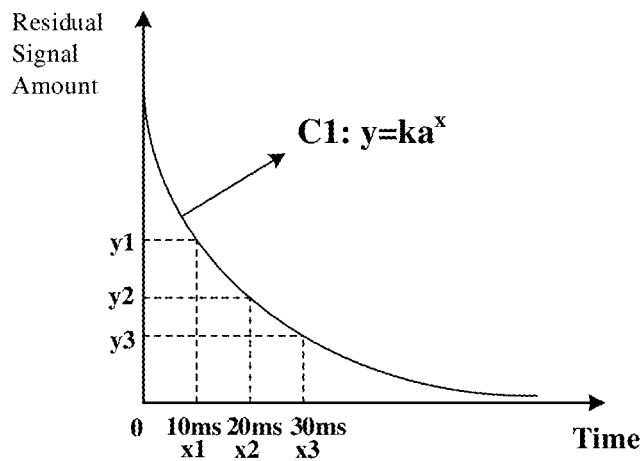
FIG. 3 is a time-varying curve of a residual signal amount in a photosensitive component.

In addition, the inventor further found through research that when the above-described afterimage phenomenon fades, the fading speed is not linear with respect to time, and the fading speed of the afterimage phenomenon is faster first and then becomes slower, that is, the fading speed is getting slower and slower. That is, a speed of discharging the residual charges of the previous frame in a photosensitive component is getting slower and slower. For example, FIG. 3 shows a time-varying curve C1 of a residual signal amount in the photosensitive component. Generally, because the residual charges in the photosensitive component cannot be directly obtained, a certain circuit is needed to convert the residual charges into other parameters such as a voltage value, so as to obtain a corresponding residual signal amount.

A texture image acquisition method, a texture image acquisition circuit and a display panel provided by at least one embodiment of the present disclosure are just intended to obtain a discharged amount of residual charges within a certain integral time period according to the above-described variation rule when the afterimage phenomenon fades, so as to further obtain a photosensitive signal corresponding to a texture image, so that effectiveness and accuracy in obtaining the texture image can be improved.

Hereinafter, the embodiments of the present disclosure and examples thereof are described in detail with reference to the accompanying drawings.

Figure 4:
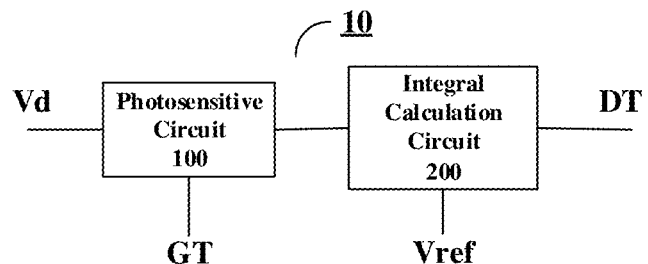
FIG. 4 is a schematic diagram of a texture image acquisition circuit provided by at least one embodiment of the present disclosure.

At least one embodiment of the present disclosure provides a texture image acquisition method; for example, the texture image acquisition method may be used for a texture image acquisition circuit; FIG. 4 shows an exemplary texture image acquisition circuit 10, and the texture image acquisition circuit 10 comprises a photosensitive circuit 100. Hereinafter, operation steps comprised in the texture image acquisition method are described with reference to FIG. 4, FIG. 6 and FIG. 7. The texture image acquisition method comprises operation steps of:

Step S100: allowing the photosensitive circuit 100 to receive light from a texture, and obtaining a first curve C1 based on a signal amount accumulated by the photosensitive circuit 100 within a first integral time period IP1, in which the first curve C1 is a time-varying curve of a residual signal amount, and the residual signal amount is a signal amount remaining after a signal amount which remains after a signal amount, left over by the photosensitive circuit 100 before the first integral time period IP1, is released over time.

Step S200: obtaining a first acquisition value based on a signal amount accumulated by the photosensitive circuit 100 within a second integral time period IP2, in which the second integral time period is after the first integral time period.

Step S300: obtaining a first photosensitive signal of an image of the texture, based on the first curve C1 and the first acquisition value.

Figure 6:
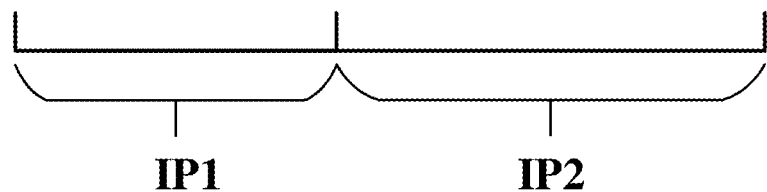
FIG. 6 is a schematic diagram of a texture image acquisition method provided by at least one embodiment of the present disclosure.
Figure 7:
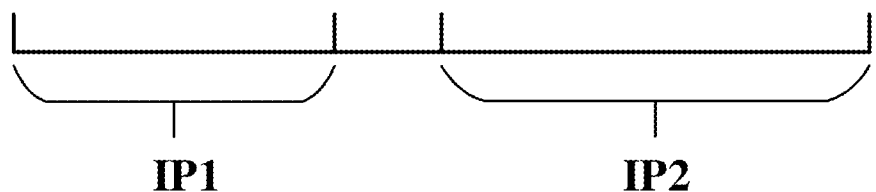
FIG. 7 is a schematic diagram of another texture image acquisition method provided by at least one embodiment of the present disclosure.

For example, as illustrated in FIG. 6 and FIG. 7, in terms of time sequence, the second integral time period IP2 is after the first integral time period IP1. For example, as illustrated in FIG. 6, in some embodiments, the second integral time period IP2 and the first integral time period IP1 are continuous in terms of time sequence, that is, there is no time interval between the second integral time period IP2 and the first integral time period IP1. Or, as illustrated in FIG. 7, in some other embodiments, the second integral time period IP2 and the first integral time period IP1 are discontinuous in terms of time sequence, that is, there is an time interval between the second integral time period IP2 and the first integral time period IP1.

For example, after a light source array used for a previous frame is turned off, a light source array used for a current frame is turned on, and at this time, residual charges of the previous frame exist in the photosensitive circuit 100. As can be known from the above, the residual charges can be gradually discharged over time, and meanwhile, the photosensitive circuit 100 converts the received light, for example, the light from the texture, into electric charges. As illustrated in FIG. 4, the above-described texture image acquisition circuit 10 further comprises an integral calculation circuit 200; for example, the integral calculation circuit 200 is configured to perform an integral calculation on the amount of charges accumulated by the photosensitive circuit 100 and convert an analog amount of charges into a digital signal amount, thereby obtaining the signal amount corresponding to the amount of charges accumulated by the photosensitive circuit 100. For example, when the photosensitive circuit 100 and the integral calculation circuit 200 are turned on and are electrically connected to each other, the amount of charges accumulated by the photosensitive circuit 100 can be discharged to the integral calculation circuit 200; and the discharged amount of charges includes two portions: one portion is a discharged amount of the residual charges of the previous frame, and the other portion is a discharged amount corresponding to an amount of charges obtained by converting the received light in the current frame by the photosensitive circuit 100. It should be noted that, in the embodiment of the present disclosure, the signal amount which remains after a signal amount, left over by the photosensitive circuit 100 before the first integral time period IP1, is released over time is referred as the residual signal amount, and the first curve C1 is a time-varying curve of the residual signal amount.

For example, a control signal GT is provided to the photosensitive circuit 100 during a certain time period A to cause the photosensitive circuit 100 and the integral calculation circuit 200 to be turned off; during the time period A, the residual charges in the photosensitive circuit 100 are discharged over time, and meanwhile, the photosensitive circuit 100 also converts the received light into electric charges. Then, a control signal GT may be provided to the photosensitive circuit 100 to cause the photosensitive circuit 100 and the integral calculation circuit 200 to be turned on, so that the photosensitive circuit 100 can discharge the charges accumulated in the time period A to the integral calculation circuit 200, and the integral calculation circuit 200 performs an integral calculation on an amount of the received charges to obtain a corresponding signal amount, for example, the signal amount may be obtained from a data output terminal DT of the integral calculation circuit 200; for example, the integral calculation circuit 200 is further configured to receive a reference voltage Vref to perform the integral calculation.

In step S100, because the amount of charges discharged by the residual charges in the first integral time period IP1 varies with time, the first curve C1 can be obtained according to the residual signal amount. The first curve C1 is only related to the residual signal amount, and unrelated to the signal amount obtained by the photosensitive circuit 100 through converting the received light.

In step S200, the obtained first acquisition value includes two portions: one portion is a signal amount released by the residual signal amount in the second integral time period IP2, and the other portion is a signal amount obtained by the photosensitive circuit 100 through converting the received light.

Then in step S300, the first photosensitive signal of the image of the texture can be obtained based on the first curve C1 and the first acquisition value. For example, a portion about the residual signal amount in the first acquisition value may be removed based on the first curve C1, which cause the obtained first photosensitive signal to be only related to the light from the texture that is received by the photosensitive circuit 100, and unrelated to the residual signal amount. For example, after the first photosensitive signal is obtained, the first photosensitive signal may be further processed by a processing circuit to obtain a texture image, thereby completing texture recognition. The texture image acquisition method provided by the embodiment of the present disclosure can cause the finally obtained first photosensitive signal to be only related to the light from the texture that is received by the photosensitive circuit 100, and unrelated to the residual signal amount of the photosensitive circuit 100, so that the effectiveness and the accuracy of final texture recognition may be improved.

For example, in the texture image acquisition method provided by some embodiments of the present disclosure, the above-described step S300 includes the following operation steps.

Step S310: obtaining the signal amount released by the residual signal amount within the second integral time period IP2 based on the first curve C1, and recording the signal amount released by the residual signal amount within the second integral time period IP2 based on the first curve C1 as a first reference value.

Step S320: subtracting the first reference value from the first acquisition value to obtain the first photosensitive signal.

For example, after the first curve C1 is obtained, a value of a residual signal amount of the photosensitive circuit 100 that corresponds to any moment can be obtained, and then in step S310, the signal amount released by the residual signal amount within the second integral time period IP2, that is, the first reference value, is obtained based on the first curve C1. For example, a value of a residual signal amount corresponding to a starting moment of the second integral time period IP2 may be obtained based on the first curve C1, a value of a residual signal amount corresponding to an ending moment of the second integral time period IP2 may be obtained based on the first curve C1; and then, the first reference value is obtained by subtracting the value of the residual signal amount corresponding to the ending moment of the second integral time period IP2 from the value of the residual signal amount corresponding to the starting moment of the second integral time period IP2. Next, in the step S320, the first photosensitive signal can be obtained by subtracting the first reference value from the first acquisition value.

According to the above description, after the first curve C1 is obtained, a value of a residual signal amount of the photosensitive circuit 100 that corresponds to any moment can be obtained, therefore in the texture image acquisition method provided by the embodiment of the present disclosure, the second integral time period IP2 is not required to be continuous with the first integral time period IP1, and as illustrated in FIG. 7, the second integral time period IP2 and the first integral time period IP1 may be discontinuous, that is, there is an time interval between the second integral time period IP2 and the first integral time period IP1.

In a texture image acquisition method provided by some embodiments of the present disclosure, one example of the above-described step S100 includes the following operation steps.

Step S110: allowing the first integral time period IP1 to include N sub-integral time periods.

Step S120: obtaining a signal amount accumulated by the photosensitive circuit 100 within an n-th sub-integral time period at an end of the n-th sub-integral time period, and recording the signal amount accumulated by the photosensitive circuit 100 within the n-th sub-integral time period at the end of the n-th sub-integral time period as an n-th sub-acquisition value.

Step S130: obtaining the first curve C1 according to N sub-acquisition values.

N is greater than or equal to 2, and n satisfies 1≤n≤N.

Figure 8:
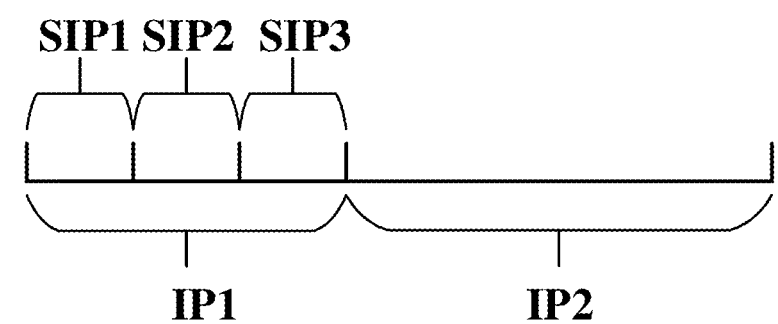
FIG. 8 is a schematic diagram of further another texture image acquisition method provided by at least one embodiment of the present disclosure.

For example, in some embodiments, as illustrated in FIG. 8, the above-described N=3, that is, one specific example of the above-described step S100 includes the following operation steps.

Step S111: allowing the first integral time period IP1 to include a first sub-integral time period SIP1, a second sub-integral time period SIP2, and a third sub-integral time period SIP3. For example, the second sub-integral time period SIP2 and the first sub-integral time period SIP1 are continuous, and the third sub-integral time period SIP3 and the second sub-integral time period SIP2 are continuous.

Step S121: obtaining a signal amount accumulated by the photosensitive circuit 100 within the first sub-integral time period SIP1 at an end of the first sub-integral time period SIP1, and recording the signal amount accumulated by the photosensitive circuit 100 within the first sub-integral time period SIP1 at the end of the first sub-integral time period SIP1 as a first sub-acquisition value F1; obtaining a signal amount accumulated by the photosensitive circuit 100 within the second sub-integral time period SIP2 at an end of the second sub-integral time period SIP2, and recording the signal amount accumulated by the photosensitive circuit 100 within the second sub-integral time period SIP2 at the end of the second sub-integral time period SIP2 as a second sub-acquisition value F2; obtaining a signal amount accumulated by the photosensitive circuit 100 within the third sub-integral time period SIP3 at an end of the third sub-integral time period SIP3, and recording the signal amount accumulated by the photosensitive circuit 100 within the third sub-integral time period SIP3 at an end of the third sub-integral time period SIP3 as a third sub-acquisition value F3.

Step S131: obtaining the first curve C1, according to the first sub-acquisition value F1, the second sub-acquisition value F2, and the third sub-acquisition value F3.

For example, in some embodiments, as illustrated in FIG. 3, the first curve C1 satisfies a first exponential function $y=ka^x$, then the above-described step S131 may include the following operation steps.

Step S1311: obtaining a first equation $F1=ka^0-ka^{x1}+W1$ according to the first sub-acquisition value F1 and the first exponential function;

Step S1312: obtaining a second equation $F2=ka^{x1}-ka^{x2}+W2$ according to the second sub-acquisition value F2 and the first exponential function;

Step S1313: obtaining a third equation $F3=ka^{x2}-ka^{x3}+W3$ according to the third sub-acquisition value F3 and the first exponential function; and Step S1314: obtaining the first exponential function according to the first equation, the second equation and the third equation.

In the above-described expressions of the exponential functions, F1 represents the first sub-acquisition value, F2 represents the second sub-acquisition value, F3 represents the third sub-acquisition value, x1 represents an ending moment of the first sub-integral time period SIP1, x2 represents an ending moment of the second sub-integral time period SIP2, x3 represents an ending moment of the third sub-integral time period SIP3, W1 represents a signal amount obtained as the photosensitive circuit 100 converts light from the texture within the first sub-integral time period SIP1, W2 represents a signal amount obtained by the photosensitive circuit 100 through converting the light from the texture within the second sub-integral time period SIP2, and W3 represents a signal amount obtained by the photosensitive circuit 100 through converting the light from the texture within the third sub-integral time period SIP3.

Hereinafter, one specific example of the above-described step S111, step S121 and step S131 are described with reference to FIG. 3, FIG. 4 and FIG. 9.

Figure 9:
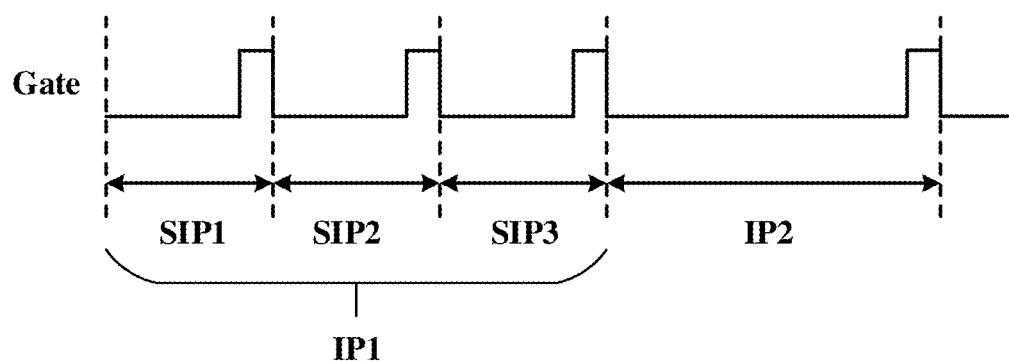
FIG. 9 is a schematic diagram of further another texture image acquisition method provided by at least one embodiment of the present disclosure.

For example, as illustrated in FIG. 3, FIG. 4 and FIG. 9, in one example, the first sub-integral time period SIP1, the second sub-integral time period SIP2, and the third sub-integral time period SIP3 are of an equal duration. For example, in some embodiments, the first sub-integral time period SIP1 is of a duration of 10 milliseconds (ms).

For example, at a zero moment, a low-level control signal GT is provided to the photosensitive circuit 100 to cause the photosensitive circuit 100 and the integral calculation circuit 200 to be turned off, then at the end of the first sub-integral time period SIP1, that is, x1=10 ms, a high-level control signal GT is provided to the photosensitive circuit 100 to cause the photosensitive circuit 100 and the integral calculation circuit 200 to be turned on, so that the first sub-acquisition value F1 is obtained at the data output terminal DT, as $F1=k-ka^{10}+W1$. It should be noted that, in the first sub-integral time period SIP1, a pulse width of the control signal GT (i.e., duration at the high level) is, for example, on an order of microseconds (μs), so the pulse width of the control signal GT can be ignored relative to the duration of the first sub-integral time period SIP1. Similarly, in description hereinafter, the pulse width of the control signal GT can also be ignored as for the duration of the second sub-integral time period SIP2 and the duration of the third sub-integral time period SIP3, and no detail about this is repeated.

After the first sub-integral time period SIP1 ends, when the second sub-integral time period SIP2 starts, a low-level control signal GT is provided to the photosensitive circuit 100 to cause the photosensitive circuit 100 and the integral calculation circuit 200 to be turned off, then at the end of the second sub-integral time period SIP2, that is, x2=20 ms, a high-level control signal GT is provided to the photosensitive circuit 100 to cause the photosensitive circuit 100 and the integral calculation circuit 200 to be turned on, so that the second sub-acquisition value F2 can be obtained at the data output terminal DT, as $F2=k^{10}-ka^{20}+W2$.

After the second sub-integral time period SIP2 ends, when the third sub-integral time period SIP3 starts, a low-level control signal GT is provided to the photosensitive circuit 100 to cause the photosensitive circuit 100 and the integral calculation circuit 200 to be turned off, then at the end of the third sub-integral time period SIP3, that is, x3=30 ms, a high-level control signal GT is provided to the photosensitive circuit 100 to cause the photosensitive circuit 100 and the integral calculation circuit 200 to be turned on, so that the third sub-acquisition value F3 can be obtained at the data output terminal DT, as $F3=k^{20}-ka^{30}+W3$.

The first equation, the second equation and the third equation are organized into a first equation set; because the first sub-integral time period SIP1, the second sub-integral time period SIP2, and the third sub-integral time period SIP3 are all of a duration of 10 ms, W1=W2=W3; and thus, the first equation set includes three equations and three unknown quantities; and k and a can be obtained by solving the first equation set, and thereby the first curve C1 is finally obtained.

For example, in the texture image acquisition method provided by some embodiments, the second integral time period IP2 is of a duration of 60 ms, so the first reference value can be obtained according to the first curve C1 as well as the starting moment and the ending moment of the second integral time period IP2, and then the first photosensitive signal of the image of the texture can be obtained by subtracting the first reference value from the first acquisition value.

It should be noted that, W1 (W2 or W3), that is, the signal amount obtained by the photosensitive circuit 100 through converting the light from the texture within the first sub-integral time period SIP1 (the second sub-integral time period SIP2 or the third sub-integral time period SIP3), can also be obtained by solving the above-described first equation set; and the texture image can also be obtained by performing data processing on the signal amount. However, because the residual signal amount in the photosensitive circuit 100 is released more at the beginning than the time period after that, a value of above-described W1 is relatively small, which is not favorable for subsequent data processing.

In the texture image acquisition method provided by at least one embodiment of the present disclosure, by setting the second integral time period IP2, because the residual signal amount of the photosensitive circuit 100 in the second integral time period IP2 is small, that is, the first reference value is relatively small, the finally obtained signal amount of the image about the texture included in the first photosensitive signal is relatively large, which thus is more favorable for the subsequent data processing to obtain a more effective and more accurate texture image.

It should be noted that, in some embodiments of the present disclosure, setting the duration of the first sub-integral time period SIP1 to 10 milliseconds (ms) and setting the duration of the second integral time period IP2 to 60 ms are only exemplary; the embodiments of the present disclosure include but are not limited thereto; and according to actual needs, other suitable values may also be selected for the duration of the first sub-integral time period SIP1 and the second integral time period IP2.

For example, in some other embodiments, as illustrated in FIG. 3, the first curve C1 satisfies the first exponential function $y=ka^x$, and the above-described step S131 includes the following operation steps.

Step S1315: obtaining a fourth equation $F2-F1=2ka^{x1}-ka^0-ka^{x2}$ according to the first sub-acquisition value F1, the second sub-acquisition value F2, and the first exponential function;

Step S1316: obtaining a fifth equation $F3-F2=2ka^{x2}-ka^{x1}-ka^{x3}$ according to the second sub-acquisition value F2, the third sub-acquisition value F3, and the first exponential function; and Step S1317 obtaining the first exponential function according to the fourth equation and the fifth equation.

In the above-described expressions, F1 represents the first sub-acquisition value, F2 represents the second sub-acquisition value, F3 represents the third sub-acquisition value, x1 represents the ending moment of the first sub-integral time period, x2 represents the ending moment of the second sub-integral time period, and x3 represents the ending moment of the third sub-integral time period.

Hereinafter, one specific example of the above-described step S111, step S121 and step S131 is described with reference to FIG. 3, FIG. 4 and FIG. 9.

For example, as illustrated in FIG. 3, FIG. 4 and FIG. 9, in one example, the first sub-integral time period SIP1, the second sub-integral time period SIP2, and the third sub-integral time period SIP3 are of an equal duration. For example, in some embodiments, the first sub-integral time period SIP1 is of a duration of 10 milliseconds (ms).

For example, at a zero moment, a low-level control signal GT is provided to the photosensitive circuit 100 to cause the photosensitive circuit 100 and the integral calculation circuit 200 to be turned off; then at the end of the first sub-integral time period SIP1, that is, x1=10 ms, a high-level control signal GT is provided to the photosensitive circuit 100 to cause the photosensitive circuit 100 and the integral calculation circuit 200 to be turned on, so that the first sub-acquisition value F1 can be obtained at the data output terminal DT.

After the first sub-integral time period SIP1 ends, when the second sub-integral time period SIP2 starts, a low-level control signal GT is provided to the photosensitive circuit 100 to cause the photosensitive circuit 100 and the integral calculation circuit 200 to be turned off, then at the end of the second sub-integral time period SIP2, that is, x2=20 ms, a high-level control signal GT is provided to the photosensitive circuit 100 to cause the photosensitive circuit 100 and the integral calculation circuit 200 to be turned on, so that the second sub-acquisition value F2 can be obtained at the data output terminal DT.

After the second sub-integral time period SIP2 ends, when the third sub-integral time period SIP3 starts, a low-level control signal GT is provided to the photosensitive circuit 100 to cause the photosensitive circuit 100 and the integral calculation circuit 200 to be turned off, then at the end of the third sub-integral time period SIP3, that is, x3=30 ms, a high-level control signal GT is provided to the photosensitive circuit 100 to cause the photosensitive circuit 100 and the integral calculation circuit 200 to be turned on, so that the third sub-acquisition value F3 can be obtained at the data output terminal DT.

The fourth equation $F2-F1=2ka^{10}-k-ka^{20}$ may be obtained according to the first sub-acquisition value F1 and the second sub-acquisition value F2 obtained; and the fifth equation $F3-F2=2ka^{20}-ka^{10}-ka^{30}$ may be obtained according to the second sub-acquisition value F2 and the third sub-acquisition value F3 obtained.

The fourth equation and the fifth equation are organized into a second equation set; the second equation set includes two equations and two unknown quantities; and by solving the second equation set, k and a can be obtained, thereby the first curve C1 is finally obtained.

It should be noted that, the foregoing embodiments are described by taking that the first integral time period IP1 includes three sub-integral time periods; the embodiments of the present disclosure include but are not limited thereto; for example, in some cases, the first curve C1 may also be a linear curve varying with respect to time, and in this case, it is only necessary to make the first integral time period IP1 include two sub-integral time periods, and no details will be repeated here.

Figure 10:
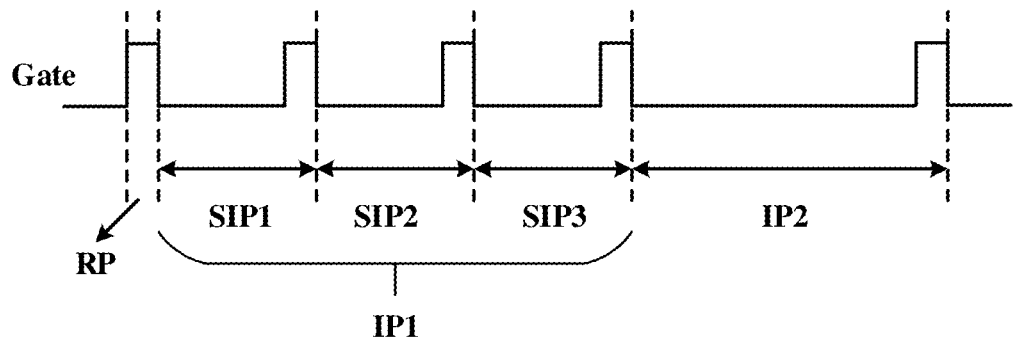
FIG. 10 is a schematic diagram of further another texture image acquisition method provided by at least one embodiment of the present disclosure.

In the texture image acquisition method provided by some embodiments of the present disclosure, as illustrated in FIG. 10, the texture image acquisition method further comprises the following operation steps.

Step S400: resetting the photosensitive circuit 100 in a reset time period RP, in which the reset time period RP precedes the first integral time period IP1.

As illustrated in FIG. 4 and FIG. 10, in the reset time period RP, a high-level control signal GT is provided to the photosensitive circuit 100 to cause the photosensitive circuit 100 and the integral calculation circuit 200 to be turned on, so that the photosensitive circuit 100 discharges charges through the integral calculation circuit 200; however, it should be noted that, after the reset time period RP, charges of the previous frame that remain in the photosensitive circuit 100 cannot be completely discharged.

Figure 5:
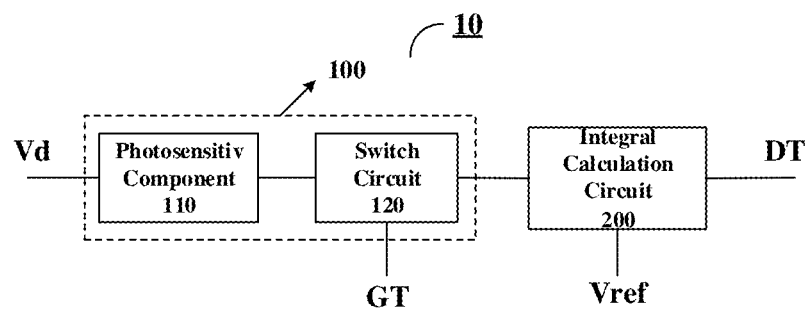
FIG. 5 is a schematic diagram of another texture image acquisition circuit provided by at least one embodiment of the present disclosure.

For example, in some embodiments, as illustrated in FIG. 5, the photosensitive circuit 100 includes a photosensitive component 110 and a switch circuit 120; and the switch circuit 120 is electrically connected with the photosensitive component 110 and the integral calculation circuit 200. In this case, the above-described step S400 includes the following operation steps.

Step S410: providing a control signal GT to the switch circuit 120 in the reset time period RP to cause the switch circuit 120 to be turned on, which further causes the photosensitive component 110 to discharge charges through the switch circuit 120 and the integral calculation circuit 200.

For example, in some embodiments, as illustrated in FIG. 5, the photosensitive circuit 100 includes a photosensitive component 110 and a switch circuit 120; and the switch circuit 120 is electrically connected with the photosensitive component 110 and the integral calculation circuit 200. In this case, the above-described step S200 includes the following operation steps.

Step S210: providing a control signal GT to the switch circuit 120 at the beginning of the second integral time period IP2 to cause the switch circuit 120 to be turned off, then providing a control signal GT to the switch circuit 120 at the end of the second integral time period IP2 to cause the switch circuit 120 to be turned on, and performing an integral calculation using the integral calculation circuit 200 so as to obtain the first acquisition value.

For example, in some embodiments, as illustrated in FIG. 5, the photosensitive circuit 100 includes a photosensitive component 110 and a switch circuit 120; and the switch circuit 120 is electrically connected with the photosensitive component 110 and the integral calculation circuit 200. In this case, the above-described step S120 includes the following operation steps.

Step S1201: providing a control signal GT to the switch circuit 120 at the beginning of the n-th sub-integral time period to cause the switch circuit 120 to be turned off, then providing a control signal GT to the switch circuit 120 at the end of the n-th sub-integral time period to cause the switch circuit 120 to be turned on, and performing an integral calculation using the integral calculation circuit 200 so as to obtain the n-th sub-acquisition value.

The texture image acquisition method provided by the embodiment of the present disclosure can allow the finally obtained first photosensitive signal only related to light from the texture that is received by the photosensitive circuit 100 (i.e., the signal amount related to the texture image), and unrelated to the residual signal amount of the photosensitive circuit 100, so that effectiveness and the accuracy of final texture recognition can be improved.

Figure 12:
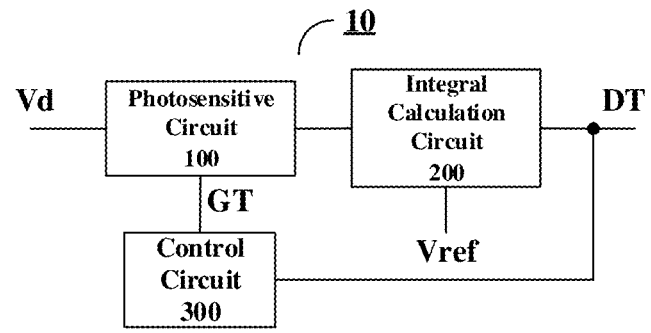
FIG. 12 is a schematic diagram of a texture image acquisition circuit provided by at least one embodiment of the present disclosure.

At least one embodiment of the present disclosure further provides a texture image acquisition circuit 10; and as illustrated in FIG. 12, the texture image acquisition circuit 10 comprises a photosensitive circuit 100 and a control circuit 300. The control circuit 300 is electrically connected with the photosensitive circuit 100; and the control circuit 300 is configured to control execution of operations below.

The control circuit 300 operates to cause the photosensitive circuit 100 to receive light from a texture, and obtain a first curve C1 based on a signal amount accumulated by the photosensitive circuit 100 within a first integral time period IP1, the first curve C1 is a time-varying curve of a residual signal amount, and the residual signal amount is a signal amount which remains after a signal amount, left over by the photosensitive circuit 100 before the first integral time period IP1, is released over time; the control circuit 300 operates to cause the photosensitive circuit 100 further to obtain a first acquisition value based on a signal amount accumulated by the photosensitive circuit 100 within a second integral time period IP2, the second integral time period is after the first integral time period; and the control circuit 300 operates to cause the photosensitive circuit 100 further to obtain a first photosensitive signal of an image about the texture based on the first curve C1 and the first acquisition value. That is, the control circuit 300 is configured to control the execution of the above-described operation steps S100, S200 and S300.

For example, as illustrated in FIG. 12, the control circuit 300 may further be electrically connected with a data output terminal DT, so that the control circuit 300 can receive the first acquisition value.

It should be noted that, the corresponding description on the above-described texture image acquisition method may be referred to for detailed description of the first integral time period IP1, the second integral time period IP2, step S100, step S200 and step S300, and no detail is repeated here.

As illustrated in FIG. 12, the texture image acquisition circuit 10 provided by some embodiments of the present disclosure further comprises an integral calculation circuit 200; the integral calculation circuit 200 is configured to perform an integral calculation on the amount of charges accumulated by the photosensitive circuit 100 and convert an analog amount of charges into a digital signal amount, thereby obtaining the signal amount corresponding to the amount of charges accumulated by the photosensitive circuit 100. For example, the signal amount may be obtained from the data output terminal DT of the integral calculation circuit 200; for example, the integral calculation circuit 200 is further configured to receive a reference voltage Vref to perform the integral calculation.

In a texture image acquisition circuit 10 provided by some embodiments of the present disclosure, the control circuit 300 is further configured to control execution of operations of obtaining a signal amount released by the residual signal amount within the second integral time period IP2 based on the first curve C1, and recording the signal amount released by the residual signal amount within the second integral time period IP2 based on the first curve C1 as a first reference value; and subtracting the first reference value from the first acquisition value to obtain the first photosensitive signal. That is, the control circuit 300 is configured to control the execution of the above-described operation steps S310 and S320.

It should be noted that, the corresponding description on the above-described texture image acquisition method may be referred to for detailed description of steps S310 and S320, and no detail is repeated here.

In a texture image acquisition circuit 10 provided by some embodiments of the present disclosure, the control circuit 300 is further configured to control execution of operations below.

The control circuit 300 operates to allow the first integral time period IP1 to include N sub-integral time periods; the control circuit 300 is configured to obtain a signal amount accumulated by the photosensitive circuit 100 within an n-th sub-integral time period at an end of the n-th sub-integral time period, and record the signal amount accumulated by the photosensitive circuit 100 within an n-th sub-integral time period at the end of the n-th sub-integral time period as an n-th sub-acquisition value; and the control circuit 300 is further configured to obtain the first curve C1 according to N sub-acquisition values, in which N is greater than or equal to 2, and n satisfies 1≤n≤N. That is, the control circuit 300 is further configured to control the execution of the above-described operation steps S110, S120 and S130.

It should be noted that, the corresponding description on the above-described texture image acquisition method may be referred to for detailed description of steps S110, S120 and S130, and no detail is repeated here.

In a texture image acquisition circuit 10 provided by some embodiments of the present disclosure, the control circuit 300 is further configured to control the execution of operations below.

The control circuit 300 operates to make the first integral time period IP1 include a first sub-integral time period SIP1, a second sub-integral time period SIP2, and a third sub-integral time period SIP3; the control circuit 300 is configured to obtain a signal amount accumulated by the photosensitive circuit 100 within the first sub-integral time period SIP1 at an end of the first sub-integral time period SIP1, and record the signal amount accumulated by the photosensitive circuit 100 within the first sub-integral time period SIP1 at the end of the first sub-integral time period SIP1 as a first sub-acquisition value F1; the control circuit 300 is further configured to obtain a signal amount accumulated by the photosensitive circuit 100 within the second sub-integral time period SIP2 at an end of the second sub-integral time period SIP2, and record the signal amount accumulated by the photosensitive circuit 100 within the second sub-integral time period SIP2 at the end of the second sub-integral time period SIP2 as a second sub-acquisition value F2; the control circuit 300 is further configured to obtain a signal amount accumulated by the photosensitive circuit 100 within the third sub-integral time period SIP3 at an end of the third sub-integral time period SIP3, and record the signal amount accumulated by the photosensitive circuit 100 within the third sub-integral time period SIP3 at the end of the third sub-integral time period SIP3 as a third sub-acquisition value F3; and obtain the first curve C1, according to the first sub-acquisition value F1, the second sub-acquisition value F2, and the third sub-acquisition value F3. That is, the control circuit 300 is configured to control execution of the above-described operation steps S111, S121 and S131.

It should be noted that, the corresponding description on the above-described texture image acquisition method may be referred to for detailed description of steps S111, S121 and S131, and no detail is repeated here.

In a texture image acquisition circuit 10 provided by some embodiments of the present disclosure, the first curve C1 satisfies a first exponential function $y=ka^x$, and the control circuit 300 is further configured to control execution of operations below.

The control circuit 300 operates to obtain a first equation $F1=ka^0-ka^{x1}+W1$ according to the first sub-acquisition value F1 and the first exponential function; the control circuit 300 is configured to obtain a second equation $F2=ka^{x1}-ka^{x2}+W2$ according to the second sub-acquisition value F2 and the first exponential function; the control circuit 300 is further configured to obtain a third equation $F3=ka^{x2}-ka^{x3}+W3$ according to the third sub-acquisition value F3 and the first exponential function; and the control circuit 300 is further configured to obtain the first exponential function according to the first equation, the second equation, and the third equation. F1 represents the first sub-acquisition value, F2 represents the second sub-acquisition value, F3 represents the third sub-acquisition value, x1 represents an ending moment of the first sub-integral time period SIP1, x2 represents an ending moment of the second sub-integral time period SIP2, x3 represents an ending moment of the third sub-integral time period SIP3, W1 represents a signal amount obtained by the photosensitive circuit 100 through converting the light from the texture within the first sub-integral time period SIP1, W2 represents a signal amount obtained by the photosensitive circuit 100 through converting the light from the texture within the second sub-integral time period SIP2, and W3 represents a signal amount obtained by the photosensitive circuit 100 through converting the light from the texture within the third sub-integral time period SIP3. That is, the control circuit 300 is configured to control the execution of the above-described operation steps S1311, S1312, S1313 and S1314.

It should be noted that, the corresponding description on the above-described texture image acquisition method may be referred to for detailed description of steps S1311, S1312, S1313 and S1314, and no details will be repeated here.

In a texture image acquisition circuit 10 provided by some embodiments of the present disclosure, the first curve C1 satisfies the first exponential function $y=ka^x$, and the control circuit 300 is further configured to control execution of operations below.

The control circuit 300 operates to obtain a fourth equation $F2-F1=2ka^{x1}-ka^0-ka^{x2}$ according to the first sub-acquisition value F1, the second sub-acquisition value F2, and the first exponential function; the control circuit 300 is configured to obtain a fifth equation $F3-F2=2ka^{x2}-ka^{x1}-ka^{x3}$ according to the second sub-acquisition value F2, the third sub-acquisition value F3, and the first exponential function; and the control circuit 300 is further configured to obtain the first exponential function according to the fourth equation and the fifth equation. That is, the control circuit 300 is configured to control the execution of the above-described operation steps S1315, S1316 and S1317.

It should be noted that, the corresponding description on the above-described texture image acquisition method may be referred to for detailed description of steps S1315, S1316 and S1317, and no detail is repeated here.

Figure 13:
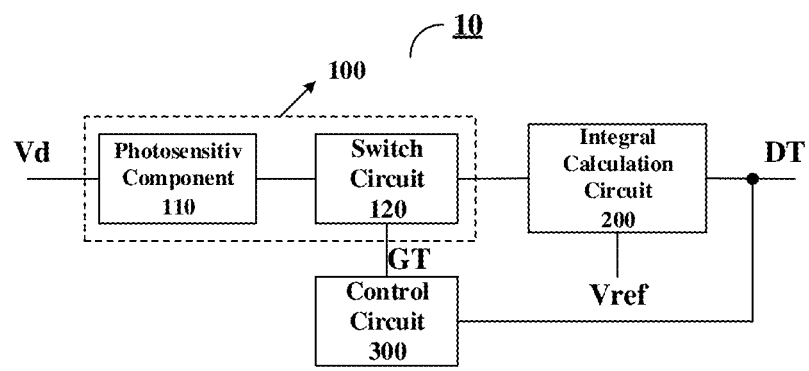
FIG. 13 is a schematic diagram of another texture image acquisition circuit provided by at least one embodiment of the present disclosure.

As illustrated in FIG. 13, in the texture image acquisition circuit 10 provided by some embodiments of the present disclosure, the photosensitive circuit 100 includes a photosensitive component 110 and a switch circuit 120; the switch circuit 120 is electrically connected with the photosensitive component 110 and the integral calculation circuit 200; and the control circuit 300 is electrically connected with the switch circuit 120. The control circuit 300 is further configured to control the execution of operations of providing a control signal GT to the switch circuit 120 at the beginning of the second integral time period IP2 to cause the switch circuit 120 to be turned off, then providing a control signal GT to the switch circuit 120 at the end of the second integral time period IP2 to cause the switch circuit 120 to be turned on, and performing an integral calculation using the integral calculation circuit 200 so as to obtain the first acquisition value. That is, the control circuit 300 is configured to control the execution of the above-described operating step S210.

It should be noted that, the corresponding description on the above-described texture image acquisition method may be referred to for detailed description of step S210, and no detail is repeated here.

In the texture image acquisition circuit 10 provided by some embodiments of the present disclosure, the control circuit 300 is further configured to control the execution of operations below.

The control circuit 300 operates to provide a control signal GT to the switch circuit 120 at the beginning of the n-th sub-integral time period to cause the switch circuit 120 to be turned off, then provide a control signal GT to the switch circuit 120 at the end of the n-th sub-integral time period to cause the switch circuit 120 to be turned on, and perform an integral calculation using the integral calculation circuit 200 to obtain the n-th sub-acquisition value. That is, the control circuit 300 is configured to control the execution of the above-described operation step S1201.

It should be noted that, the corresponding description on the above-described texture image acquisition method may be referred to for detailed description of step S1201, and no detail is repeated here.

In a texture image acquisition circuit 10 provided by some embodiments of the present disclosure, the control circuit 300 is further configured to control the execution of operations below.

The control circuit 300 operates to provide a control signal GT to the switch circuit 120 in a reset time period RP to cause the switch circuit 120 to be turned on, so that the photosensitive component 110 discharges charges through the switch circuit 120 and the integral calculation circuit 200. That is, the control circuit 300 is configured to control the execution of the above-described operating step S410.

It should be noted that, the corresponding description on the above-described texture image acquisition method may be referred to for detailed description of step S410, and no detail is repeated here.

Figure 14:
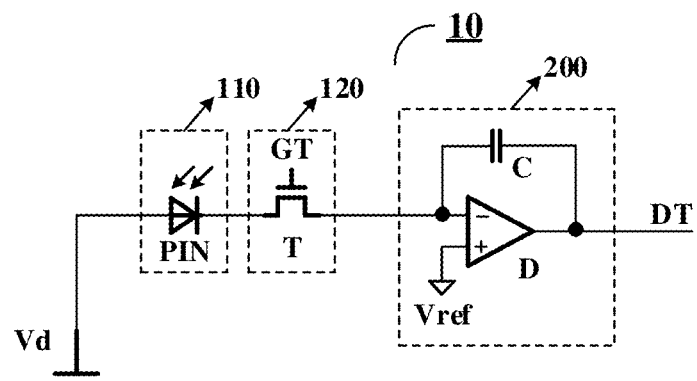
FIG. 14 is a circuit diagram of a texture image acquisition circuit provided by at least one embodiment of the present disclosure.

A texture image acquisition circuit 10 provided by some embodiments of the present disclosure may be implemented as a circuit structure illustrated in FIG. 14; and it should be noted that FIG. 14 does not show the control circuit 300.

For example, as illustrated in FIG. 14, the photosensitive component 110 may be a PIN-type diode; and the embodiment of the present disclosure includes but is not limited thereto; for example, the photosensitive component 110 may also be other type of photodiode (e.g., a PN-type diode or an OPD-type diode), or various suitable types of photosensitive components. According to needs, the photosensitive component 110 may, for example, sense only light of a certain wavelength (e.g., red light or green light), or may also sense all visible light.

For example, as illustrated in FIG. 14, the switch circuit 120 may be a transistor T, for example, the transistor T is an N-type transistor. The integral calculation circuit 200 may be implemented to include an operational amplifier D and a storage capacitor C.

As illustrated in FIG. 14, a first electrode (e.g., an anode) of the PIN-type diode is configured to receive a first voltage Vd; a second electrode (e.g., a cathode) of the PIN-type diode is connected with a first electrode of the transistor T; a gate electrode of the transistor T is configured to receive the control signal GT; a second electrode of the transistor T is connected with an inverting input terminal of the operational amplifier D; a non-inverting input terminal of the operational amplifier D is configured to receive a reference voltage Vref; a first electrode of the storage capacitor C is connected with the inverting input terminal of the operational amplifier D; a second electrode of the storage capacitor C is connected with an output terminal of the operational amplifier D; and the output terminal of the operational amplifier D is used as the data output terminal DT. It should be noted that, in order that the PIN-type diode may convert received light into electric charges, a voltage applied across both ends of the PIN-type diode needs to be a reverse voltage, that is, the reference voltage Vref needs to be greater than the first voltage Vd. For example, the reference voltage Vref is 1 V and the first voltage Vd is −2 V; or the reference voltage Vref is 1.25 V and the first voltage Vd is −4 V.

It should be noted that the transistors used in the embodiments of the present disclosure may all be thin film transistors or field effect transistors or other switch devices with the same characteristics. The source electrode and drain electrode of the transistor used here may be symmetrical in structure, therefore the source electrode and drain electrode are structurally indistinguishable. In the embodiments of the present disclosure, in order to distinguish the two electrodes of the transistor except the gate electrode, one of the two electrodes is directly described as the first electrode, and the other of the two electrodes is described as the second electrode, therefore the first electrode and the second electrode of all or part of the transistors in the embodiments of the present disclosure are interchangeable as required. For example, the first electrode of the transistor described in the embodiments of the present disclosure is the source electrode and the second electrode is the drain electrode; alternatively, the first electrode of the transistor is the drain electrode and the second electrode is the source electrode.

In addition, transistors can be divided into n-type transistors and p-type transistors according to the characteristics thereof. In the case that the transistor is a p-type transistor, the on voltage is a low level voltage (e.g., 0 V, −5 V, −10 V or other suitable voltage), and the off voltage is a high level voltage (e.g., 5 V, 10 V or other suitable voltage); in the case that the transistor is an n-type transistor, the on voltage is a high level voltage (e.g., 5 V, 10 V or other suitable voltage), and the off voltage is a low level voltage (e.g., 0 V, −5 V, −10 V or other suitable voltage). The transistors in the embodiments of the present disclosure are described by taking an n-type transistor as an example. Based on the description and teaching of this implementation in the present disclosure, one of ordinary skill in the art can easily think that the embodiments of the present disclosure can also adopt p-type transistors without creative labor.

Hereinafter, a working principle of the texture image acquisition circuit 10 illustrated in FIG. 14 is described with reference to a time sequence diagram of the signal illustrated in FIG. 10.

In the reset time period RP, a high-level control signal GT is provided to the gate electrode of the transistor T to cause the transistor T to be turned on, so that the PIN-type diode discharges charges through the transistor T and the operational amplifier D.

Then the first sub-integral time period SIP1 starts, and a low-level control signal GT is provided to the gate electrode of the transistor T to cause the transistor T to be turned off; in the first sub-integral time period SIP1, the PIN-type diode may convert received light into electric charges on the one hand, and on the other hand, the residual charges in the PIN-type diode are discharged. At the end of the first sub-integral time period SIP1, a high-level control signal GT is provided to the gate electrode of the transistor T to cause the transistor T to be turned on, so that the charges accumulated by the PIN-type diode within the first sub-integral time period SIP1 are transmitted to the inverting input terminal of the operational amplifier D through the transistor T; and then through an integral calculation of the operational amplifier D and the storage capacitor C, the first sub-acquisition value F1 is obtained at the data output terminal DT.

The description in the above-described first sub-integral time period SIP1 may be referred to for the working principle of the texture image acquisition circuit 10 in the second sub-integral time period SIP2, the third sub-integral time period SIP3, and the second integral time period IP2, and no detail is repeated here. The second sub-acquisition value F2, the third sub-acquisition value F3, and the first acquisition value may be obtained respectively through the second sub-integral time period SIP2, the third sub-integral time period SIP3, and the second integral time period IP2.

For example, as illustrated in FIG. 13, the control circuit 300 is further configured to be electrically connected with the data output terminal DT, so that the first sub-acquisition value F1, the second sub-acquisition value F2, the third sub-acquisition value F3 and the first acquisition value as described above may be received from the data output terminal DT; then the control circuit 300 may obtain the first curve C1 according to the first sub-acquisition value F1, the second sub-acquisition value F2 and the third sub-acquisition value F3; next, the first reference value may be obtained according to the first curve C1; and finally, the first reference value is subtracted from the first acquisition value to obtain the first photosensitive signal.

For example, the control circuit 300 may transmit the first photosensitive signal to a processing circuit at a back end for further data processing, so as to obtain the texture image according to the first photosensitive signal. For another example, the control circuit 300 may also be directly used to process the first photosensitive signal.

It should be noted that, in the embodiment of the present disclosure, the first sub-acquisition value F1, the second sub-acquisition value F2, the third sub-acquisition value F3, the first acquisition value, and the first reference value may be, for example, voltage values; and the embodiment of the present disclosure includes but is not limited to this.

Figure 15:
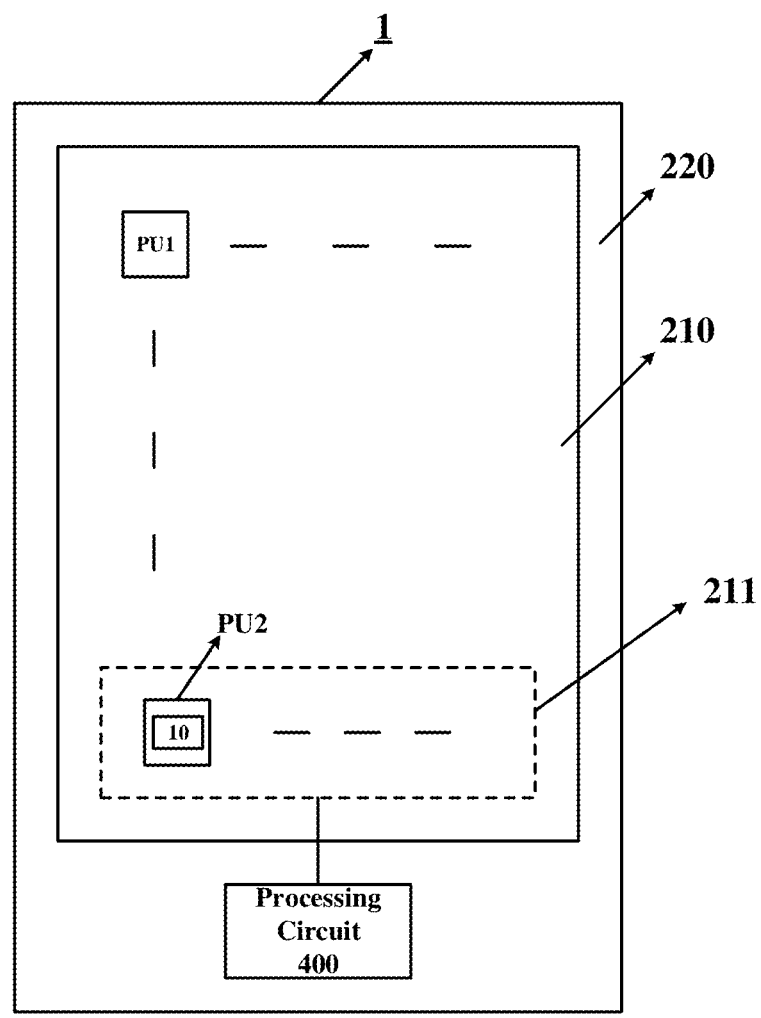
FIG. 15 is a schematic diagram of a display panel provided by at least one embodiment of the present disclosure.

At least one embodiment of the present disclosure further provides a display panel 1. As illustrated in FIG. 15, the display panel 1 includes a display region 210, the display region 210 includes a texture recognition region 211. It should be noted that in the embodiment of the present disclosure, the texture recognition region 211 is a region where the operation body performs the texture recognition on the display panel 1. The size of the texture recognition region 211 illustrated in FIG. 15 is only schematic. For example, the size of the texture recognition region 211 may be the same as the size of the display region 210, that is, the operation body can perform the texture recognition at any position of the display region 210 of the display panel 1.

It should be noted that in the embodiments of the present disclosure, the operation body with textures may be a hand, and in this case, the textures in the texture image acquisition method are skin textures, such as fingerprints, palmprints, etc. In addition, the operation body with textures can also be non-living bodies with certain textures, such as objects with certain textures made of materials such as resin, and the embodiments of the present disclosure are not specifically limited to this.

For example, as illustrated in FIG. 15, a pixel unit array is provided in the display region 210, and the pixel unit array includes a plurality of pixel units arranged in an array. Herein, in order to distinguish different pixel units, for example, pixel units located in the texture recognition region 211 are labeled PU2, and pixel units located in the display region 210 but not in the texture recognition region 211 are labeled PU1. Each of the pixel units PU2 located in the texture recognition region 211 includes any one of the texture image acquisition circuits 10 provided by the embodiments of the present disclosure. For example, the texture image acquisition circuit 10 can be directly formed on the display substrate of the display panel 1 by adopting a thin film process.

For example, each pixel unit (including pixel unit PU1 and pixel unit PU2) includes a thin film transistor and a light emitting device, the light emitting device includes, for example, an anode, a cathode, and a light emitting layer between the anode and the cathode. For example, the pixel unit array of the display panel 1 is implemented to be a light source array, and the plurality of pixel units are implemented to be a plurality of light sources. That is, the pixel units of the display panel 1 also serve as photosensitive light sources, so that the compactness of the display panel can be improved and the arrangement difficulty of each functional structure can be reduced. For example, each photosensitive light source includes one or more pixel units, so that the photosensitive light source can be formed into a light source in a certain shape, such as a point light source, a line light source, a Z-shaped light source, a light source in a shape of "回", or the like, through different arrangements of the one or more pixel units.

For example, the pixel units in the entire display region 210 of the display panel 1 may be controlled to as also serve as the photosensitive light sources, and the texture image acquisition circuit 10 may also be arranged in each pixel unit accordingly, thereby realizing the full-screen texture recognition.

For example, as illustrated in FIG. 15, the display panel 1 further comprises a peripheral region 220 surrounding a display region 210; for example, the control circuit 300 in the texture image acquisition circuit 10 may be provided in the peripheral region 220.

Figure 16:
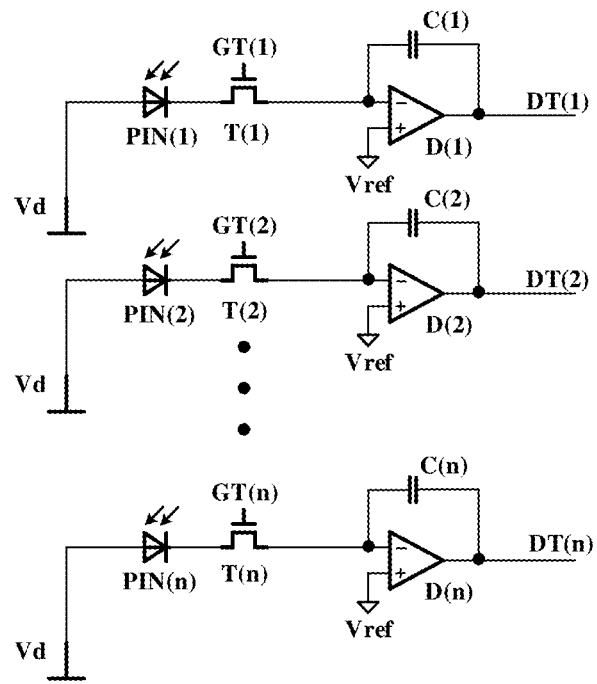
FIG. 16 is a circuit diagram of a plurality of texture image acquisition circuits in a display panel provided by at least one embodiment of the present disclosure.

For example, in the case that texture recognition region 211 includes a plurality of rows of pixel units PU2, FIG. 16 shows an example for arranging texture image acquisition circuits 10 (in only one column of pixel units PU2 illustrated). As illustrated in FIG. 16, a texture image acquisition circuit 10 in a first row of pixel units PU2 includes a PIN-type diode PIN(1), a transistor T(1), an operational amplifier D(1), and a storage capacitor C(1), and outputs respective acquisition values from a data output terminal DT(1). Numbers in parentheses in respective callouts in the diagram represent corresponding numbers of rows, the same as respective embodiments below, and no details will be repeated.

As illustrated in FIG. 16, each texture image acquisition circuit 10 is separately provided with an operational amplifier and a storage capacitor, which may reduce mutual influence between texture image acquisition circuits 10 in adjacent rows of pixel units.

Figure 11:
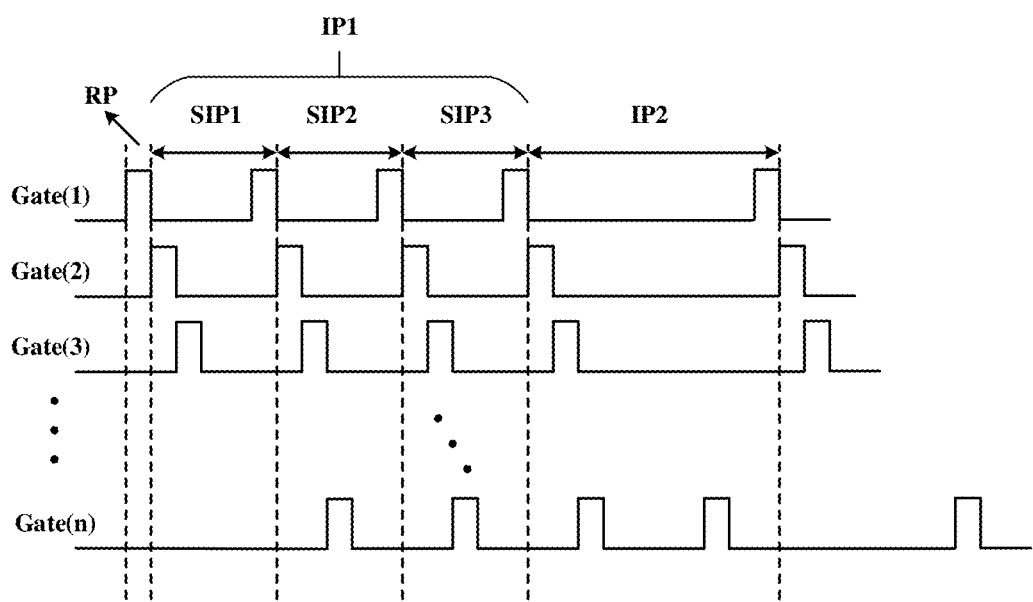
FIG. 11 is a schematic diagram of further another texture image acquisition method provided by at least one embodiment of the present disclosure.
Figure 17:
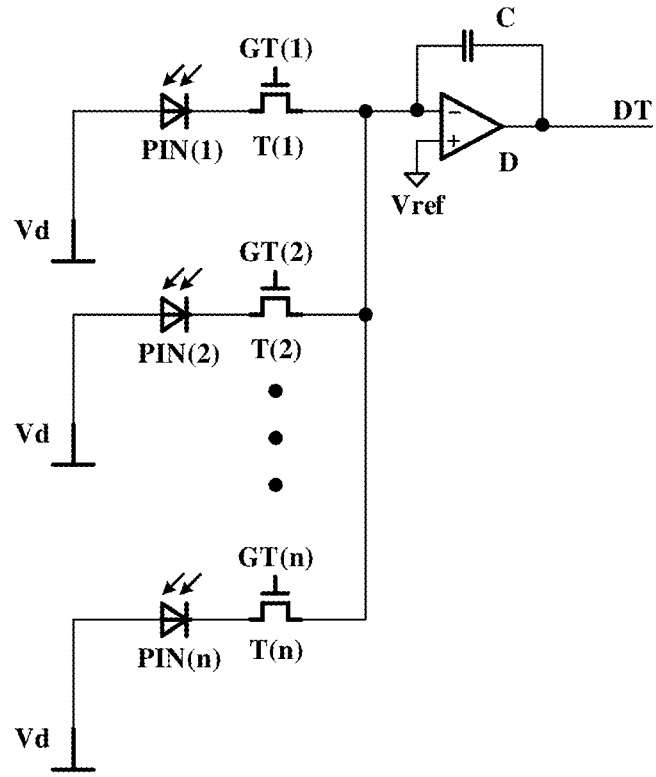
FIG. 17 is a circuit diagram of a plurality of texture image acquisition circuits in another display panel provided by at least one embodiment of the present disclosure.

For another example, in some other embodiments, as illustrated in FIG. 17, a plurality of texture image acquisition circuits 10 may also share a same integral calculation circuit 200 (operational amplifier D and storage capacitor C), which, thus, may reduce an area occupied by the plurality of texture image acquisition circuits 10 that need to be arranged. FIG. 11 shows a time sequence diagram of signals for the plurality of texture image acquisition circuits illustrated in FIG. 17; as illustrated in FIG. 11, because texture image acquisition circuits in pixel units located in a same column and in different rows need to share the same integral calculation circuit 200, control signals (GT(1), GT(2), GT(3), . . . , GT(n)) of the texture image acquisition circuits in different rows of pixel units are sequentially provided in terms of time sequence.

As illustrated in FIG. 15, the display panel 1 further comprises a processing circuit 400; the processing circuit 400 is electrically connected with the pixel unit PU2 in the texture recognition region 211, for example, electrically connected with the control circuit 300 in the texture image acquisition circuit 10 in the pixel unit PU2; and the processing circuit 400 is configured to process a plurality of first photosensitive signals obtained by the plurality of texture image acquisition circuits 10 to obtain a texture image. The processing circuit 400 may be implemented by a general-purpose processor or a dedicated processor, which will not be limited in the embodiment of the present disclosure.

In the display panel 1 provided in the above embodiment, the texture image acquisition circuit 10 is directly formed on the display substrate of the display panel 1 and integrated in the pixel unit PU2. In this case, the pixel unit PU2 can also serve as the photosensitive light source of the texture image acquisition circuit 10. Embodiments of the present disclosure include but are not limited to this, for example, the texture image acquisition circuit 10 can be separately provided, for example, the texture image acquisition circuit 10 is attached to the back surface of the display substrate of the display panel 1, in this case, it is necessary to separately provide a light emitting element as a photosensitive light source of the texture image acquisition circuit 10.

For example, the display panel 1 is an organic light emitting diode (OLED) display panel or a quantum dot light emitting diodes (QLED) display panel, etc. The embodiments of the present disclosure are not specifically limited to this. The OLED display panel can be, for example, a flexible OLED display panel. OLED display panel has self-luminous characteristics, and the light emission of its pixel units can also be controlled or modulated according to needs, thus providing convenience to the acquisition of texture images and helping to improve the integration level. When an operating body touches the texture recognition region 211 of the display panel 1 provided by the embodiment of the present disclosure, the texture image acquisition circuit 10 in the pixel unit PU2 in the texture recognition region 211 receives the light from the texture, for example, light reflected from the texture, and meanwhile, the texture image acquisition method provided by the embodiment of the present disclosure may make the finally obtained first photosensitive signal only related to light from the texture that is received by the photosensitive circuit 100, and unrelated to the residual signal amount of the photosensitive circuit 100, so that the effectiveness and the accuracy of texture recognition can be improved.

At least one embodiment of the present disclosure further provides a display device which includes any display panel 1 provided in the embodiments of the present disclosure. The display device in this embodiment can be any product or component with display function such as a liquid crystal panel, a liquid crystal television, a display, an OLED panel, an OLED television, electronic paper, a mobile phone, a tablet computer, a notebook computer, a digital photo frame, a navigator, etc.

For technical effects of a display apparatus provided by the embodiments of the present disclosure, the corresponding description on the texture image acquisition method and the display panel 1 in the above-described embodiments may be referred to, and no detail is repeated here.

What have been described above are only specific implementations of the present disclosure, the protection scope of the present disclosure is not limited thereto. The protection scope of the present disclosure should be based on the protection scope of the claims.

What is claimed is:

1. A texture image acquisition method for a texture image acquisition circuit, wherein the texture image acquisition circuit comprises a photosensitive circuit,
the texture image acquisition method comprises:
   allowing the photosensitive circuit to receive light from a texture, and obtaining a first curve based on a signal amount accumulated by the photosensitive circuit within a first integral time period, wherein the first curve is a time-varying curve of a residual signal amount, and the residual signal amount is a signal amount which remains after a signal amount, left over by the photosensitive circuit before the first integral time period, is released over time;
   obtaining a first acquisition value based on a signal amount accumulated by the photosensitive circuit within a second integral time period, wherein the second integral time period is after the first integral time period; and
   obtaining a first photosensitive signal of an image of the texture, based on the first curve and the first acquisition value.

2. The texture image acquisition method according to claim 1, wherein obtaining the first photosensitive signal based on the first curve and the first acquisition value comprises:
   obtaining a signal amount which is released by the residual signal amount within the second integral time period based on the first curve and is recorded as a first reference value; and
   subtracting the first reference value from the first acquisition value to obtain the first photosensitive signal.

3. The texture image acquisition method according to claim 1, wherein obtaining the first curve based on the signal amount accumulated by the photosensitive circuit within the first integral time period comprises:
   allowing the first integral time period to comprise N sub-integral time periods;
   obtaining a signal amount which is accumulated by the photosensitive circuit within an n-th sub-integral time period at an end of the n-th sub-integral time period and is recorded as an n-th sub-acquisition value, wherein N is greater than or equal to 2, n satisfies $1 \leq n \leq N$, and N sub-acquisition values are obtained when n is successively equal to 1, 2, . . . , N; and
   obtaining the first curve according to the N sub-acquisition values.

4. The texture image acquisition method according to claim 3, wherein obtaining the first curve based on the signal amount accumulated by the photosensitive circuit within the first integral time period comprises:
   allowing the first integral time period to comprise a first sub-integral time period, a second sub-integral time period, and a third sub-integral time period;
   obtaining a signal amount which is accumulated by the photosensitive circuit within the first sub-integral time period at an end of the first sub-integral time period and is recorded as a first sub-acquisition value;
   obtaining a signal amount which is accumulated by the photosensitive circuit within the second sub-integral time period at an end of the second sub-integral time period and is recorded as a second sub-acquisition value;
   obtaining a signal amount which is accumulated by the photosensitive circuit within the third sub-integral time period at an end of the third sub-integral time period and is recorded as a third sub-acquisition value; and obtaining the first curve according to the first sub-acquisition value, the second sub-acquisition value, and the third sub-acquisition value.

5. The texture image acquisition method according to claim 4, wherein the first curve satisfies a first exponential function $y=ka^x$; and obtaining the first curve according to the first sub-acquisition value, the second sub-acquisition value, and the third sub-acquisition value comprises:
obtaining a first equation $F1=ka^0-ka^{x1}+W1$ according to the first sub-acquisition value and the first exponential function;
obtaining a second equation $F2=ka^{x1}-ka^{x2}+W2$ according to the second sub-acquisition value and the first exponential function;
obtaining a third equation $F3=ka^{x2}-ka^{x3}+W3$ according to the third sub-acquisition value and the first exponential function; and
obtaining the first exponential function according to the first equation, the second equation and the third equation,
wherein F1 represents the first sub-acquisition value, F2 represents the second sub-acquisition value, F3 represents the third sub-acquisition value, x1 represents an ending moment of the first sub-integral time period, x2 represents an ending moment of the second sub-integral time period, x3 represents an ending moment of the third sub-integral time period, W1 represents a signal amount obtained by the photosensitive circuit through converting the light from the texture within the first sub-integral time period, W2 represents a signal amount obtained by the photosensitive circuit through converting the light from the texture within the second sub-integral time period, and W3 represents a signal amount obtained by the photosensitive circuit through converting the light from the texture within the third sub-integral time period.

6. The texture image acquisition method according to claim 4, wherein the first sub-integral time period, the second sub-integral time period, and the third sub-integral time period are of an equal duration.

7. The texture image acquisition method according to claim 4, wherein the first sub-integral time period is of a duration of 10 milliseconds, and the second integral time period is of a duration of 60 milliseconds.

8. The texture image acquisition method according to claim 4, wherein the first sub-integral time period, the second sub-integral time period, and the third sub-integral time period are of an equal duration; the first curve satisfies a first exponential function $y=ka^x$; and obtaining the first curve according to the first sub-acquisition value, the second sub-acquisition value, and the third sub-acquisition value comprises:
obtaining a fourth equation: $F2-F1=2ka^{x1}-ka^0-ka^{x2}$ according to the first sub-acquisition value, the second sub-acquisition value, and the first exponential function;
obtaining a fifth equation: $F3-F2=2ka^{x2}-ka^{x1}-ka^{x3}$ according to the second sub-acquisition value, the third sub-acquisition value, and the first exponential function; and
obtaining the first exponential function according to the fourth equation and the fifth equation,
wherein F1 represents the first sub-acquisition value, F2 represents the second sub-acquisition value, F3 represents the third sub-acquisition value, x1 represents an ending moment of the first sub-integral time period, x2 represents an ending moment of the second sub-integral time period, and x3 represents an ending moment of the third sub-integral time period.

9. The texture image acquisition method according to claim 1, further comprising:
resetting the photosensitive circuit in a reset time period, wherein the reset time period precedes the first integral time period.

10. The texture image acquisition method according to claim 9, wherein the texture image acquisition circuit further comprises an integral calculation circuit,
the photosensitive circuit comprises a photosensitive component and a switch circuit, and the switch circuit is electrically connected with the photosensitive component and the integral calculation circuit; and
resetting the photosensitive circuit in the reset time period comprises: providing a control signal to the switch circuit in the reset time period to cause the switch circuit to be turned on, which further causes the photosensitive component to discharge charges through the switch circuit and the integral calculation circuit.

11. The texture image acquisition method according to claim 10, wherein obtaining the first acquisition value based on the signal amount accumulated by the photosensitive circuit within the second integral time period comprises:
providing a control signal to the switch circuit at beginning of the second integral time period to cause the switch circuit to be turned off, then providing a control signal to the switch circuit at an end of the second integral time period to cause the switch circuit to be turned on, and performing an integral calculation using the integral calculation circuit so as to obtain the first acquisition value.

12. The texture image acquisition method according to claim 3, wherein the texture image acquisition circuit further comprises an integral calculation circuit,
the photosensitive circuit comprises a photosensitive component and a switch circuit, and the switch circuit is electrically connected with the photosensitive component and the integral calculation circuit;
obtaining the signal amount which is accumulated by the photosensitive circuit within an n-th sub-integral time period at an end of the n-th sub-integral time periods and is recorded as an n-th sub-acquisition value comprises:
providing a control signal to the switch circuit at beginning of the n-th sub-integral time period to cause the switch circuit to be turned off, then providing a control signal to the switch circuit at an end of the n-th sub-integral time period to cause the switch circuit to be turned on, and performing an integral calculation using the integral calculation circuit so as to obtain the n-th sub-acquisition value.

13. A texture image acquisition circuit, comprising a photosensitive circuit and a control circuit, wherein
the control circuit is electrically connected with the photosensitive circuit; and the control circuit is configured to
allow the photosensitive circuit to receive light from a texture and obtain a first curve based on a signal amount accumulated by the photosensitive circuit within a first integral time period, the first curve being a time-varying curve of a residual signal amount, and the residual signal amount being a signal amount which remains after a signal amount, left over by the photosensitive circuit before the first integral time period, is released over time, obtain a first acquisition value based on a signal amount accumulated by the photosensitive circuit within a second integral time period, the second integral time period being after the first integral time period, and obtain a first photosensitive signal of an image about the texture, based on the first curve and the first acquisition value.

14. The texture image acquisition circuit according to claim 13, wherein the control circuit is further configured to obtain a signal amount which is released by the residual signal amount within the second integral time period based on the first curve and is recorded as a first reference value, and subtract the first reference value from the first acquisition value to obtain the first photosensitive signal.

15. The texture image acquisition circuit according to claim 13, wherein the control circuit is further configured to allow the first integral time period to comprise N sub-integral time periods, obtain a signal amount which is accumulated by the photosensitive circuit within an n-th sub-integral time period at an end of the n-th sub-integral time period and is recorded as an n-th sub-acquisition value, wherein N is greater than or equal to 2, n satisfies 1≤n≤N, and N sub-acquisition values are obtained when n is successively equal to 1, 2, . . . , N, and obtain the first curve according to the N sub-acquisition values.

16. The texture image acquisition circuit according to claim 15, wherein the control circuit is further configured to allow the first integral time period to comprise a first sub-integral time period, a second sub-integral time period, and a third sub-integral time period, obtain a signal amount which is accumulated by the photosensitive circuit within the first sub-integral time period at an end of the first sub-integral time period and is recorded as a first sub-acquisition value, obtain a signal amount which is accumulated by the photosensitive circuit within the second sub-integral time period at an end of the second sub-integral time period and is recorded as a second sub-acquisition value, obtain a signal amount which is accumulated by the photosensitive circuit within the third sub-integral time period at an end of the third sub-integral time period and is record as a third sub-acquisition value, and obtain the first curve according to the first sub-acquisition value, the second sub-acquisition value, and the third sub-acquisition value.

17. The texture image acquisition circuit according to claim 16, wherein the first curve satisfies a first exponential function $y=ka^x$; and the control circuit is further configured to obtain a first equation $F1=ka^0-ka^{x1}+W1$ according to the first sub-acquisition value and the first exponential function, obtain a second equation $F2=ka^{x1}-ka^{x2}+W2$ according to the second sub-acquisition value and the first exponential function, obtain a third equation $F3=ka^{x2}-ka^{x3}+W3$ according to the third sub-acquisition value and the first exponential function, and obtain the first exponential function according to the first equation, the second equation and the third equation, wherein F1 represents the first sub-acquisition value, F2 represents the second sub-acquisition value, F3 represents the third sub-acquisition value, x1 represents an ending moment of the first sub-integral time period, x2 represents an ending moment of the second sub-integral time period, x3 represents an ending moment of the third sub-integral time period, W1 represents a signal amount obtained by the photosensitive circuit through converting the light from the texture within the first sub-integral time period, W2 represents a signal amount obtained by the photosensitive circuit through converting the light from the texture within the second sub-integral time period, and W3 represents a signal amount obtained by the photosensitive circuit through converting the light from the texture within the third sub-integral time period.

18. The texture image acquisition circuit according to claim 15, further comprising an integral calculation circuit, wherein the photosensitive circuit comprises a photosensitive component and a switch circuit; the switch circuit is electrically connected with the photosensitive component and the integral calculation circuit, and the control circuit is electrically connected with the switch circuit;

the control circuit is further configured to provide a control signal to the switch circuit at beginning of the second integral time period to cause the switch circuit to be turned off, then provide a control signal to the switch circuit at the end of the second integral time period to cause the switch circuit to be turned on, and perform an integral calculation using the integral calculation circuit so as to obtain the first acquisition value.

19. The texture image acquisition circuit according to claim 18, wherein the control circuit is further configured to provide a control signal to the switch circuit at beginning of the n-th sub-integral time period to cause the switch circuit to be turned off, then provide a control signal to the switch circuit at an end of the n-th sub-integral time period to cause the switch circuit to be turned on, and performing an integral calculation using the integral calculation circuit so as to obtain the n-th sub-acquisition value.

20. A display panel, comprising a display region, wherein the display region comprises a texture recognition region, and a plurality of pixel units in an array are in the display region, and the pixel units in the texture recognition region each comprise the texture image acquisition circuit according to claim 13.

\* \* \* \* \*